United States Patent
Ravinoothala et al.

(10) Patent No.: US 10,120,729 B2
(45) Date of Patent: Nov. 6, 2018

(54) VIRTUAL MACHINE LOAD BALANCING

(71) Applicant: VMware, Inc., Palo Alto, CA (US)

(72) Inventors: Sreeram Ravinoothala, San Jose, CA (US); Ganesan Chandrashekhar, Campbell, CA (US)

(73) Assignee: VMWARE, INC., Palo Alto, CA (US)

( * ) Notice: Subject to any disclaimer, the term of this patent is extended or adjusted under 35 U.S.C. 154(b) by 369 days.

(21) Appl. No.: 14/181,526

(22) Filed: Feb. 14, 2014

(65) Prior Publication Data

US 2015/0234668 A1    Aug. 20, 2015

(51) Int. Cl.
*G06F 15/16* (2006.01)
*G06F 9/50* (2006.01)
*G06F 9/455* (2018.01)

(52) U.S. Cl.
CPC ........ *G06F 9/5083* (2013.01); *G06F 9/45558* (2013.01); *G06F 2009/45595* (2013.01)

(58) Field of Classification Search
CPC .................................................. G06F 9/45533
See application file for complete search history.

(56) References Cited

U.S. PATENT DOCUMENTS

| | | | |
|---|---|---|---|
| 7,478,173 B1 | 1/2009 | Delco | |
| 9,037,719 B2 | 5/2015 | Shen et al. | |
| 9,350,666 B2 | 5/2016 | Ravinoothala et al. | |
| 9,477,524 B2 | 10/2016 | Kang et al. | |
| 9,509,615 B2 | 11/2016 | Ravinoothala et al. | |
| 9,537,798 B1 | 1/2017 | Devilbiss et al. | |
| 2002/0156612 A1 | 10/2002 | Schulter et al. | |
| 2007/0140263 A1 | 6/2007 | Mitome et al. | |
| 2008/0112323 A1 | 5/2008 | Agmon et al. | |
| 2010/0257269 A1* | 10/2010 | Clark | G06F 9/4856 709/226 |
| 2011/0010515 A1* | 1/2011 | Ranade | G06F 11/1451 711/162 |
| 2011/0182289 A1* | 7/2011 | Raman | H04L 12/66 370/356 |

(Continued)

OTHER PUBLICATIONS

Final Office Action for U.S. Appl. No. 131947,934, dated Nov. 6, 2015, 45 pages.

(Continued)

*Primary Examiner* — Moustafa M Meky
*Assistant Examiner* — SM Z Islam
(74) *Attorney, Agent, or Firm* — Nicholson De Vos Webster & Elliott LLP

(57) ABSTRACT

Exemplary methods, apparatuses, and systems include virtualization software of a host computer receiving a first packet addressed to a first virtual link layer address. Each of a first plurality of virtual machines on the first host computer is configured to share the first virtual link layer address. The virtualization software of the first host computer maps a flow of packets, including the first packet, to a first virtual machine within the first plurality of virtual machines and forwards the first packet to the first virtual machine. The virtualization software of the first host computer receives a second packet from the first virtual machine in response to the first packet. The second packet includes the first virtual link layer address as a source address for the first virtual machine.

20 Claims, 4 Drawing Sheets

(56) References Cited

U.S. PATENT DOCUMENTS

| | | | |
|---|---|---|---|
| 2011/0194563 A1* | 8/2011 | Shen | G06F 9/45558 370/395.52 |
| 2011/0202920 A1* | 8/2011 | Takase | G06F 9/45558 718/1 |
| 2011/0292931 A1 | 12/2011 | Kizawa et al. | |
| 2012/0087372 A1 | 4/2012 | Narasimhan | |
| 2012/0210416 A1 | 8/2012 | Mihelich et al. | |
| 2012/0275297 A1 | 11/2012 | Subramanian | |
| 2012/0287939 A1 | 11/2012 | Leu et al. | |
| 2013/0019014 A1 | 1/2013 | Johnsen et al. | |
| 2013/0136126 A1* | 5/2013 | Wang | H04L 61/103 370/392 |
| 2013/0198355 A1 | 8/2013 | Kalyanaraman et al. | |
| 2013/0227108 A1 | 8/2013 | Dunbar et al. | |
| 2013/0308647 A1 | 11/2013 | Rosset et al. | |
| 2013/0318219 A1 | 11/2013 | Kancherla | |
| 2013/0336337 A1 | 12/2013 | Gopinath et al. | |
| 2013/0339516 A1 | 12/2013 | Chauhan et al. | |
| 2013/0339547 A1 | 12/2013 | Nath et al. | |
| 2014/0036924 A1 | 2/2014 | Christenson | |
| 2014/0307540 A1 | 10/2014 | Duda et al. | |
| 2014/0307553 A1 | 10/2014 | Fung | |
| 2014/0351443 A1 | 11/2014 | Tang et al. | |
| 2014/0365680 A1* | 12/2014 | van Bemmel | H04L 29/06 709/232 |
| 2015/0026321 A1 | 1/2015 | Ravinoothala et al. | |
| 2015/0026344 A1 | 1/2015 | Ravinoothala et al. | |
| 2015/0026345 A1 | 1/2015 | Ravinoothala et al. | |
| 2015/0026681 A1 | 1/2015 | Lin et al. | |
| 2015/0029848 A1 | 1/2015 | Jain | |
| 2015/0106804 A1 | 4/2015 | Chandrashekhar et al. | |
| 2015/0117256 A1 | 4/2015 | Sabaa et al. | |
| 2015/0172190 A1 | 6/2015 | Song | |
| 2015/0263991 A1 | 9/2015 | Macchiano et al. | |
| 2016/0218991 A1 | 7/2016 | Sharabi et al. | |
| 2017/0019369 A1 | 1/2017 | Ravinoothala | |
| 2017/0019370 A1 | 1/2017 | Ravinoothala | |

OTHER PUBLICATIONS

Notice of Allowance for U.S. Appl. No. 13/947,971, dated Jan. 11, 2016, 24 pages.

Non-Final Office Action for U.S. Appl. No. 13/947,934, dated Jun. 18, 2015, 35 pages.

Non-Final Office Action for U.S. Appl. No. 13/947,971, dated Jul. 2, 2015, 49 pages.

Non-Final Office Action for U.S. Appl. No. 13/947,952, dated Feb. 12, 2016, 13 pages.

Non Final Office Action from U.S. Appl. No. 13/947,934 dated Aug. 12, 2016, 54 pages.

Notice of Allowance from U.S. Appl. No. 13/947,952 dated Jul. 29, 2016, 19 pages.

Notice of Allowance from U.S. Appl. No. 13/947,934 dated Feb. 14, 2017, 21 pages.

RFC 826: Plummer D.C., "An Ethernet Address Resolution Protocol," Nov. 1982, 10 pages, Network Working Group, Request for Comments: 826.

Final Office Action from U.S. Appl. No. 14/800,668, dated Oct. 6, 2017, 35 pages.

Final Office Action from U.S. Appl. No. 14/800,673, dated Sep. 25, 2017, 36 pages.

* cited by examiner

VIRTUAL MACHINE LOAD BALANCING

FIELD OF THE INVENTION

The various embodiments described herein relate to distributing workloads across multiple virtual machines. In particular, the embodiments relate to a host computer's virtualization layer mapping packet flows addressed to a common virtual link layer address to individual virtual machines within a plurality of virtual machines that share the common virtual link layer address.

BACKGROUND OF THE INVENTION

Load balancing distributes workloads across multiple physical or virtual machines. In a virtualized datacenter environment, a load balancer may be implemented by a virtual machine running on one of multiple host computers. For example, one virtual machine may provide load balancing for a tenant within the datacenter. To distribute workloads, a virtual Internet Protocol (IP) address is assigned to the virtual load balancer. As each packet addressed to the virtual IP address is received, the virtual load balancer selects one of multiple physical or virtual machines to perform a service on the packet. If, for example, the packet is a request for a web server, the virtual load balancer uses a load balancing algorithm to select one of the multiple physical or virtual machines implementing the web server. The load balancer forwards the traffic to the selected physical or virtual machine, e.g., by changing the destination address of packets in a flow to the unique address of the selected physical or virtual machine. Each packet, therefore, traverses a path from a switch or router, through a virtualization software layer within a host computer, to the virtual load balancer, and, upon selection of a web server, back to the virtualization software layer and on to the web server, which may be within the same host computer or external to the host computer. Additionally, some load balancing solutions route responses from the web server back through the virtual load balancer before the response is delivered to the device that transmitted the original request for the web server. All requests, and possibly some responses, therefore pass through the virtual load balancer. The virtual load balancer, therefore, is a choke point for network throughput. Each traversal between the virtualization software layer and the virtual machine implementing the load balancer consumes memory and processing resources within the host computer.

SUMMARY OF THE INVENTION

Exemplary methods, apparatuses, and systems perform load balancing within the virtualization software layer of a host computer. The virtualization software receives a first packet addressed to a first virtual link layer address. Each of a first plurality of virtual machines on the first host computer is configured to share the first virtual link layer address. The virtualization software of the first host computer maps a flow of packets, including the first packet, to a first virtual machine within the first plurality of virtual machines and forwards the first packet to the first virtual machine. The virtualization software of the first host computer receives a second packet from the first virtual machine in response to the first packet. The second packet includes the first virtual link layer address as a source address for the first virtual machine.

In one embodiment, the load balancing within the virtualization software layer supports migration of virtual machines between host computers. For example, each of a second plurality of virtual machines on a second host computer is also configured to share the first virtual link layer address. Additionally, each of the first plurality of virtual machines on the first host computer and each of the second plurality of virtual machines on the second host computer is also configured with a private link layer address that is not shared with other virtual machines within the first and second plurality of virtual machines. The mapping of the flow of packets to the first virtual machine includes mapping the flow of packets to the private link layer address for the first virtual machine. When the virtualization software of the first host computer receives a third packet addressed to the first link layer address, the virtualization software determines that the third packet belongs to the flow of packets to the first virtual machine. If the first virtual machine has been migrated to the second host computer, the virtualization software of the first host computer updates the destination address of the third packet to replace the virtual link layer address with the private link layer address for the first virtual machine (e.g., based upon the mapping of the flow of packets). The virtualization software of the first host computer then transmits the updated third packet to the second host computer.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein perform virtual machine load balancing within the virtualization software layer of a host computer. Each of a plurality of virtual machines on the host computer is configured to share a virtual link layer address and is capable of providing the same service. A virtual switch within the virtualization software layer receives packets addressed to the virtual link layer address and uses a load balancing algorithm to map flows of packets to virtual machines within the plurality of virtual machines. As a result, the host computer does not need to rely upon a load balancer implemented by a virtual machine or an external load balancer to distribute workloads across the plurality of virtual machines.

Figure 1:
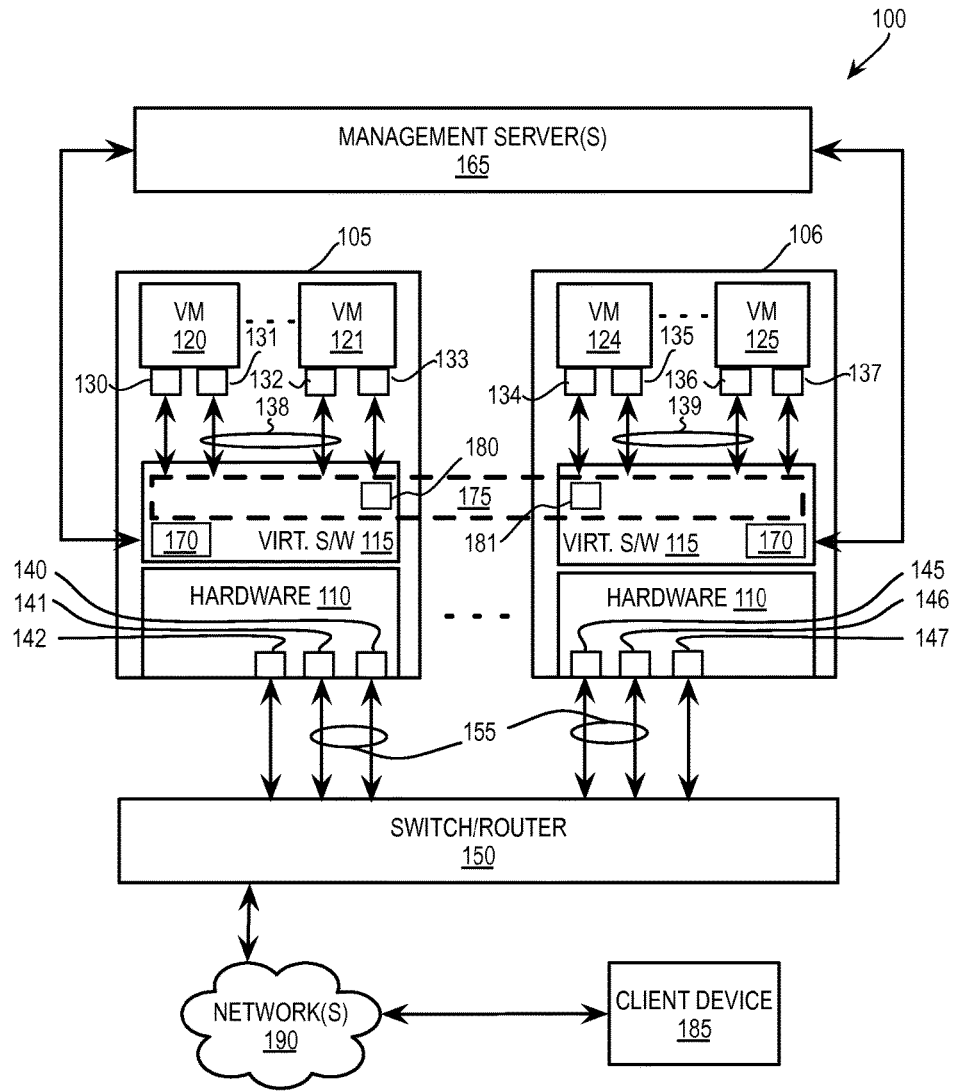
FIG. 1 illustrates, in block diagram form, an exemplary virtual datacenter environment including one or more networked processing devices implementing load balancing within the virtualization software layer of a host computer.

FIG. 1 illustrates, in block diagram form, exemplary virtual datacenter environment 100 including one or more networked processing devices implementing load balancing within the virtualization software layer of a host computer. Server-based computing in a virtualized datacenter 100 environment allows client device(s) 185 to access centrally-managed virtual desktops and network services, such as those implemented by VMs 120-125, via network(s) 190 (e.g., a local area network or other private or publically accessible wide area network, such as the Internet).

Virtualized datacenter 100 includes multiple physical computers (host computers) 105-106. While only two host computers are shown, additional host computers may be included in virtualized datacenter 100, as indicated by the ellipses between host computers 105 and 106. Each host computer 105-106 includes a plurality of VMs 120-125. While only two VMs are shown in each host computer, additional VMs may be included in each host computer, as indicated by the ellipses between VMs 120-125. VMs 120-125 are complete computation environments, containing virtual equivalents of the hardware and system software components of a physical system and are typically implemented by an extensive virtualization infrastructure, which includes a variety of software and hardware components. Virtualization software 115 (e.g., a hypervisor) running on hardware 110 of each host computer 105-106 manages one or more respective VMs 120-125. Virtualization software 115 manages physical resources as well as maintains virtual-to-physical hardware mappings. For example, each VM 120-125 receive and transmit packets via a plurality of virtual ports 130-137 and physical ports 140-147. As used herein, packet refers to a packet or frame of network traffic according to a networking protocol and the terms "packet" and "frame" may be used interchangeably.

Hardware 110 includes physical ports 140-147. Physical ports 140-147 are network interfaces used to connect host computers 105-106 to switch 150. In one embodiment, connections or links between physical ports 140-147 and switch 150 are configured into a link aggregation group (LAG). Switch 150 views ports within a LAG as a single logical uplink. For example, ports 140, 141, 145, and 146 are illustrated as being included within LAG 155 and are treated by switch 150 as a single logical uplink. While switch 150 is illustrated as a single device, multiple switches in communication with one another may be used in place of switch 150.

One or more management server(s) 165 is coupled to each host computer 105. Management server(s) 165 are responsible for provisioning and maintaining a multitude of VMs 120-125 on hosts 105-106. In one embodiment, the provisioning of VMs 120-125 includes assigning a private link layer address and private network layer address to each VM. Additionally, the provisioning of VMs 120-125 includes assigning one or more virtual link layer addresses and one or more virtual network layer addresses to VMs 120-125. For example, all of VMs 120-125 may be configured to receive packets addressed to a common virtual link layer address and send reply packets using the virtual link layer address as the source address. Additionally, management server(s) 165 may configure one or more of LAG agent 170, virtual distributed switch (VDS) 175, and one or more switch agents 180-181 within virtualization software 115 of hosts 105-106.

Each LAG agent 170 runs within virtualization software layer 115 and receives configuration information from management server(s) 165. For example, management server(s) 165 may maintain a mapping, for each host 105-106, between LAG 155 and ports 140, 141, 145, and 146. LAG agent 170 initiates configuration of LAG 155 within host computer 105 based upon the configuration information. In one embodiment, first host computer 105 configures ports 140 and 141 to be included within LAG 155 and second host computer 106 also configures ports 145 and 146 to be included within LAG 155. For example, the configuration may be implemented via negotiation between host computers 105-106 and switch 150 via ports 140, 141, 145, and 146. In one embodiment, LAG 155 is configured according to the Link Aggregation Control Protocol (LACP). For example, LAG agent 170 of each host computer 105-106 sends frames (e.g., LACPDUs, or link aggregation control protocol data units) down the links of ports 140-141 and 145-146. Switch 150, on the other end of the links, is enabled to handle LACP and sends frames up the same links. As a result, each host computer 105-106 and switch 150 detect links to combine into a single logical link. While FIG. 1 illustrates the configuration of LAG 155 as including two ports of each host computer 105-106, different numbers of ports from each host computer 105-106 may be logically combined into LAG 155. Additionally, ports of one or more other host computers (not shown) may further be configured to be included within LAG 155.

As a result of the configuration of LAG 155, switch 150 performs load balancing between uplinks to ports 140, 141, 145, and 146 within LAG 155. For example, when switch 150 receives a packet with a destination address associated with LAG 155 in a routing table or other data structure maintained by switch 150 (e.g., the virtual network layer address or virtual link layer address described herein), switch 150 selects an uplink corresponding to one of ports 140, 141, 145, and 146 to transmit the packet. In one embodiment, a port within first LAG 155 is selected based upon a hash of a packet header tuple (e.g., including one or more of a source IP address, destination IP address, source port number, destination port number, and protocol), a round robin algorithm, or another load balancing algorithm. In one embodiment, the negotiation frames exchanged between host computers 105-106 and switch 150 in configuring LAG 155 include selection of a particular load balancing algorithm, e.g., as indicated in frames sent from host computer(s) 105-106 to switch 150. Alternatively, switch 150 performs a default load balancing algorithm in response to the configuration of LAG 155.

In one embodiment, host computers 105-106 include ports excluded from the common LAG to enable VMs 120-125 to send and receive packets using private link layer addresses. For example, ports 142 and 147 of host computers 105-106 are excluded from LAG 155. Additionally, host computers 105-106 may have additional ports (not shown) that are excluded from LAG 155. Sending packets with a private link layer address as a source address via ports excluded from LAG 155 ensures that switch 150 will forward future packets with the private link layer address as a destination address via these excluded ports 142 and 147 rather than a port within LAG 155. If the packets were forwarded via LAG 155, it is possible that the packets would be forwarded to the incorrect host computer 105/106 based upon the hashing/load balancing implemented as a part of LAG 155.

In one embodiment, management server(s) 165 further provide LAG agent 170, VDS 175, or switch agents 180/181 with a mapping of VMs 120-125 to LAG 155. For example, VMs 120-125 are capable of transmitting and/or receiving packets via LAG 155 and/or ports 142 or 147. Management server(s) 165 configuration data enables virtualization software 115 to differentiate source and destination addresses and use LAG 155 or port 142/147 accordingly. An outgoing packet with the virtual link layer address as a source address may be sent via LAG 155 while an outgoing packet with a private link layer address as a source or destination address may be sent via port 142/147.

Additionally, management server(s) 165 may maintain a forwarding/routing table and/or other configuration data for virtual switches in multiple host computers 105. When these virtual switches are centrally managed and configured by management server(s) 165, the individual host-level virtual switches are abstracted into a single large VDS 175 that spans multiple hosts at the datacenter level. VDS 175 forwards traffic internally, e.g., between VM 120 and VM 121 within host computer 105, or externally, e.g., from VM 120 of host computer 105 to VM 125 of host computer 106 via ports 142 and 147.

Management server(s) 165 may also configure switch agents 180-181. As described with reference to FIG. 3, switch agents 180-181 may perform load balancing to distribute traffic between VMs 120-125 internally within each host computer 105-106. For example, if VMs 120 and 121 were both instances of a web server, switch agent 180 may utilize a load balancing algorithm to determine which of VM 120 and VM 121 is to receive a given packet intended for the web server. While described with reference to switch agents 180-181, the load balancing between VMs described herein may be performed, at least in part, more generally by VDS 175 and/or virtualization software 115.

In one embodiment, one or more virtual ports of each VM 120-125 are configured as a part of a virtual link aggregation group (VLAG). For example, ports 131 and 132 of VMs 120 and 121 are configured into VLAG 138 and ports 135 and 136 of VMs 124 and 125 are configured into VLAG 139. As described herein, the configuration of VLAG 138 results in virtualization software 115 of host computer 105 performing load balancing between virtual ports 131 and 132 within VLAG 138. Similarly, the configuration of VLAG 139 results in virtualization software 115 of host computer 106 performing load balancing between virtual ports 135 and 136 within VLAG 139. For example, when VDS 175 in host computer 105 receives a packet with a destination address associated with VLAG 138 in a routing table or other data structure maintained by switch agent 180 (e.g., a virtual link layer address used by VMs 120-125), VDS 175 selects an uplink corresponding to one of virtual ports 131 and 132 to forward the packet to a corresponding VM 120/121. In one embodiment, a virtual port within VLAG 138/139 is selected based upon a hash of a packet header tuple (e.g., including one or more of a source IP address, destination IP address, source port number, destination port number, and protocol), a round robin algorithm, or another load balancing algorithm. In one embodiment, VDS 175 reads each VM's current resource load to select a virtual port. For example, virtualization software 115 may measure each VM's network, memory, and/or processor load, e.g., as expressed as a percentage of capacity, in determining the distribution of workload. In this way, a VM that is already functioning, for example, at its maximum processor bandwidth will be avoided by VDS 175 when directing new connections to one of the VMs associated with VLAG 138 or 139. Similar to LAG 155, in one embodiment, virtualization software 115 (e.g., LAG agent 170) configures VLAG 138/139 and/or the load balancing algorithm in response to configuration information received from management server(s) 165. Alternatively, switch agents 180-181 utilize a default load balancing algorithm and operates without configuration from management server(s) 165.

Additionally, switch agents 180-181 may maintain packet flow mappings, as further described below with reference to FIG. 3. For example, switch agents 180-181 may maintain a mapping of private link layer addresses of VMs 120-125 to active packet flows (e.g., TCP sessions) addressed to a virtual link layer address. As used herein, the term MAC address may be used interchangeably with a link layer address and the term IP address may be used interchangeably with a network layer address.

Figure 2:
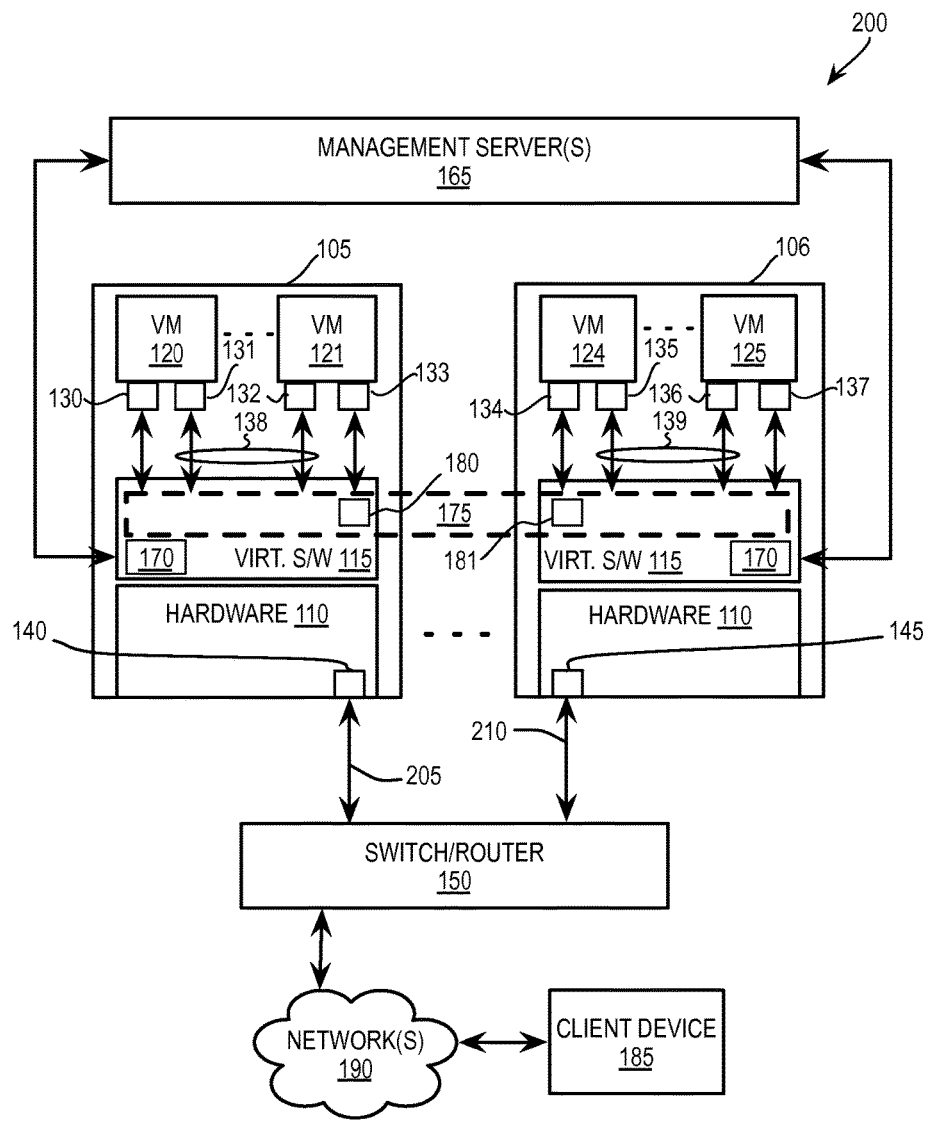
FIG. 2 illustrates, in block diagram form, another exemplary virtual datacenter environment including one or more networked processing devices implementing load balancing within the virtualization software layer of a host computer.

FIG. 2 illustrates, in block diagram form, exemplary virtual datacenter environment 200. Virtual datacenter environment 200 is similar to virtual datacenter environment 100 described above, as indicated through the use of common reference numbers. In contrast to virtual datacenter environment 100, host computers 105-106 are not connected to switch 150 via a common LAG. Instead, each host computer 105/106 has one or more physical and/or logical links to switch 150 that are independent of the links between the other host computer 106/105 and switch 105. For example, host computer 105 is illustrated with link 205 between port 140 and switch 150 and host computer 106 is illustrated with link 210 between port 145 and switch 150. While single links 205/210 are illustrated in virtual datacenter environment 200, additional links may exist between each host computer 105-106 and switch 150. Additionally, link 205 may represent a logical link, e.g., a LAG of multiple physical links between host computer 105 and switch 150. Similarly, link 210 may represent a logical link, e.g., a LAG of multiple physical links between host computer 106 and switch 150.

Figure 3:
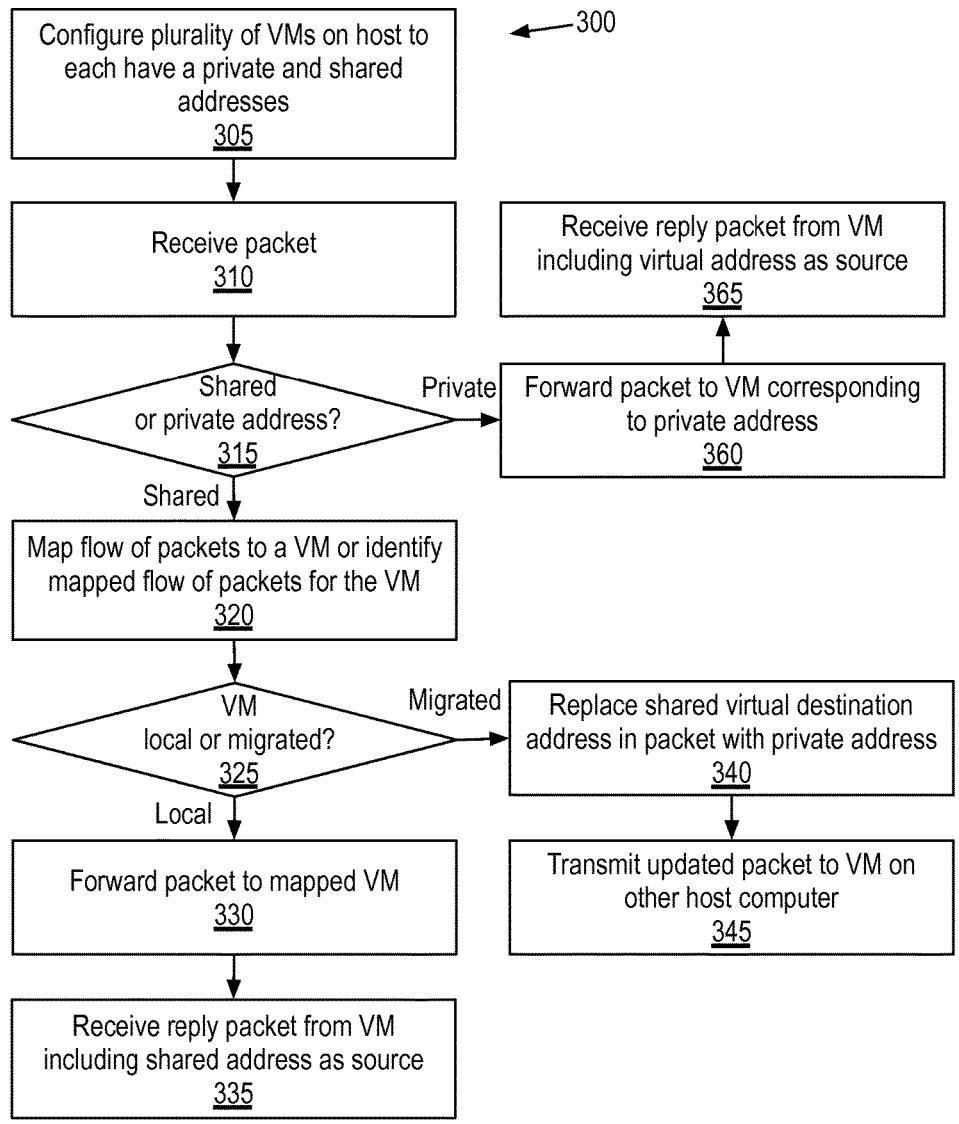
FIG. 3 is a flow chart illustrating an exemplary method of load balancing within the virtualization software layer of a host computer.

FIG. 3 is a flow chart illustrating exemplary method 300 of load balancing within the virtualization software layer of a host computer. At block 305, one or more host devices configure a plurality of VMs to each have private and shared virtual addresses. For example, virtualization software, in response to configuration data from a management server, configures each VM to have a private network layer address and a private link layer address that is not common to any of the other of the plurality of VMs. Additionally, the virtualization software configures each VM to have one or more virtual network layer addresses and one or more virtual link layer addresses that are common among all of the plurality of VMs. In one embodiment, when the host computers share a common LAG, the virtualization software configures each VM to have a single shared virtual network layer address and a single shared virtual link layer address. When the host computers do not share a common LAG, the virtualization software configures each VM to have a number of shared virtual network layer addresses corresponding to the number of host computers and a number of shared virtual link layer addresses corresponding to the number of host computers. For example, virtual datacenter environment 200 illustrates two host computers and each of VMs 120-125 would be configured with two common virtual link layer addresses and two common virtual network layer addresses.

At block 310, the virtualization software receives a packet. For example, switch 150 forwards a packet via an uplink to physical port 140/141/142 of host computer 105. A physical network interface card within hardware 110 forwards the packet to VDS 175.

At block 315, the virtualization software determines if the received packet includes a shared virtual destination address or a private destination address. For example, switch agent 180 maintains a mapping of addresses assigned to VMs 120-121 and determines if the destination address is virtual or private. In one embodiment, switch agent 180 inspects the destination network layer address. For example, an address resolution protocol (ARP) request may include a network layer destination address but serve to request the corresponding link layer address. Alternatively, switch agent 180 inspects the destination link layer address.

If the destination address is a shared virtual address, at block 320, the virtualization software maps the flow of packets, including the received packet, to a VM or otherwise identifies a previously mapped flow of packets to the VM. For example, switch agent 180 hashes a tuple of the packet's header information to select a VM 120/121 to receive the packet or determine if the packet belongs to a flow of packets previously mapped to a VM 120/121. In one embodiment, if the packet is not a part of an existing flow of packets, the virtualization software utilizes load on each VM (e.g., network, memory, and/or processor utilization) to select a VM and balance workloads across the VMs. In one embodiment, a mapped flow of packets includes an expiration time or is otherwise deleted after a threshold period of time following receipt of the latest packet in the flow. The virtualization software treats a packet that would ordinarily be treated as part of a previous packet flow, but received after the packet flow times out, as a new flow of packets.

At block 325, the virtualization software determines if the selected/mapped VM is running locally on the host computer or if the VM has migrated to another host computer. For example, host computer 105 may migrate VM 120 to host computer 106 in the middle of an existing packet flow.

If the selected/mapped VM remains locally within the host computer in receipt of the packet, at block 330, the virtualization software forwards the packet to the VM. For example, if the packet is mapped to VM 120 and VM 120 continues to run on host computer 105 when VDS 175 within host computer 105 receives the packet, VDS 175 forwards the packet to VM 120.

At block 335, the virtualization software receives a reply packet from the selected VM. The reply packet includes the shared virtual link layer as the source link layer address. The reply packet also includes the shared virtual network layer address as the source network layer address. In other words, each VM 120-125 that shares a virtual link layer address and a virtual network layer address is able to receive and send packets using the virtual link layer and virtual network layer addresses.

If the selected/mapped VM was migrated to another host computer, at block 340, the virtualization software replaces the shared virtual destination link layer address with the private link layer address for the migrated VM. For example, switch agent 180 determines that the packet belongs to a flow of packets mapped to VM 120, which has been migrated from host computer 105 to host computer 106. In one embodiment, switch agent 180 updates the packet flow mappings to indicate a VM has been migrated in response to the migration. Using the private link layer address included in the packet flow mapping, switch agent 180 modifies the received packet to change the destination address from the virtual link layer address to the private link layer address for VM 120. The destination network layer address for the packet is not modified. For example, the received packet includes the virtual network layer address as a destination address. While the link layer destination address for the packet is updated, switch agent 180 leaves the virtual network layer address as the network layer destination address.

At block 345, the virtualization software transmits the updated packet to the migrated VM on other host computer. For example, switch agent 180/VDS 175 forwards the packet via a physical network interface card within hardware 110 to switch 150. Upon receipt, switch 150 determines that the destination/private link layer address indicates that the packet is to be forwarded to host 106.

In one embodiment, if the host computers have ports/links configured within a single LAG, the host computer forwarding the packet utilizes a port/link excluded from the LAG. For example, in virtual datacenter environment 100, host computers 105-106 include ports/links configured as a part of LAG 155. Accordingly, host computer 105 transmits the modified packet via port 142 to switch 150. In turn, switch 150 forwards the packet to port 147 of host computer 147.

Returning to block 315, if the received packet includes a private destination address, at block 360, the virtualization software forwards the packet to the VM corresponding to the private address. For example, as described above, VM 120 may be migrated from host computer 105 to host computer 106. In such a situation, host computer 105 alters the destination address of a received packet that is part of an existing flow for migrated VM 120, such that the updated packet includes the private link layer address for VM 120 as a destination address. VDS 175 within host computer 106 forwards the updated packet to migrated VM 120 (e.g., within host computer 106).

At block 365, the virtualization software receives a reply packet from the VM, the packet including the virtual link layer address as a source address. Continuing the example above, migrated VM 120 receives the updated and redirected packet while running on host computer 106. VM 120 determines that the received packet includes the shared virtual network layer address as a destination address. In response, VM 120 uses the virtual link layer address rather than its private link layer address as the source address for the reply packet.

Figure 4:
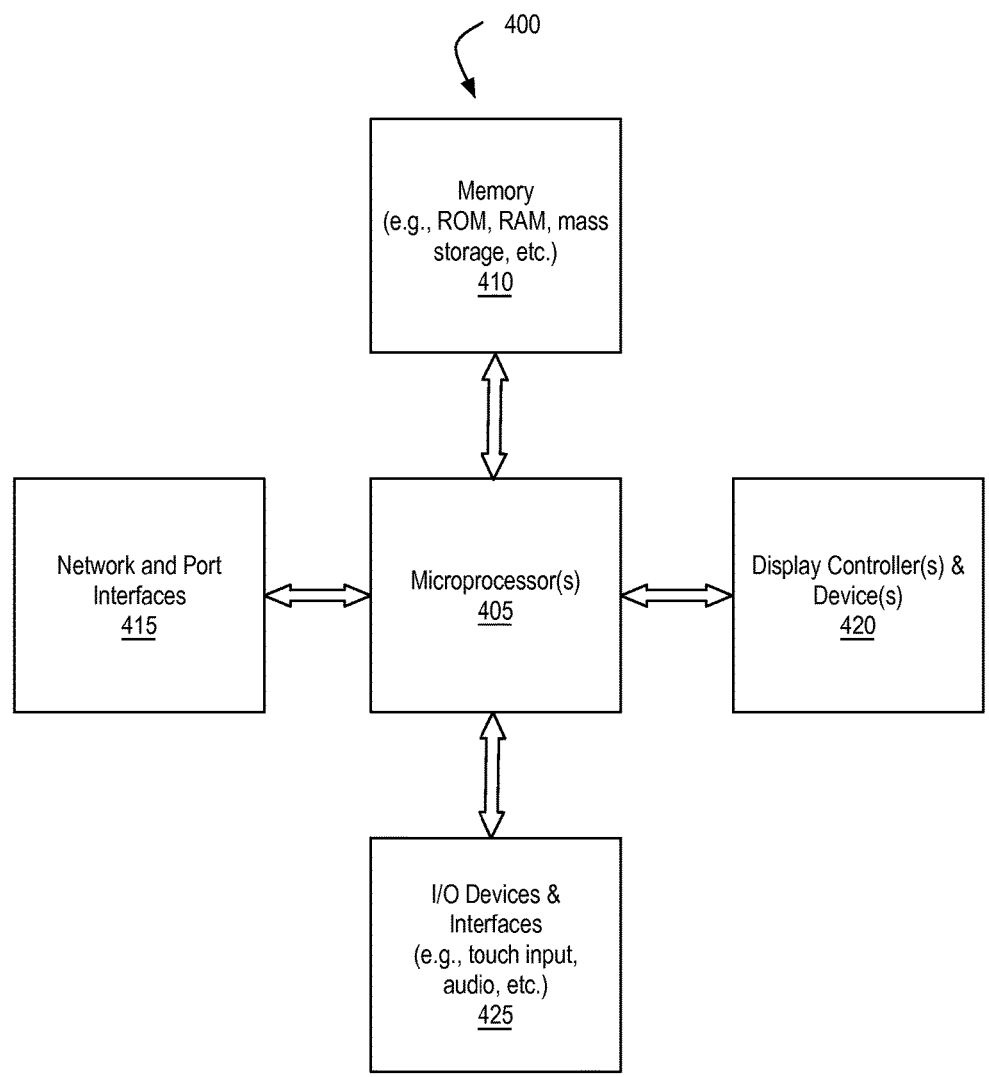
FIG. 4 illustrates, in block diagram form, an exemplary processing system to implement load balancing within the virtualization software layer of a host computer.

FIG. 4 illustrates, in block diagram form, exemplary processing system 400 to implement load balancing within the virtualization software layer of a host computer. Data processing system 400 includes one or more microprocessors 405 and connected system components (e.g., multiple connected chips). Alternatively, data processing system 400 is a system on a chip.

Data processing system 400 includes memory 410, which is coupled to microprocessor(s) 405. Memory 410 may be used for storing data, metadata, and programs for execution by the microprocessor(s) 405. Memory 410 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 410 may be internal or distributed memory.

Data processing system 400 includes network and port interfaces 415, such as a port, connector for a dock, or a connector for a USB interface, FireWire, Thunderbolt, Ethernet, Fibre Channel, etc. to connect the system 400 with another device, external component, or a network. Exemplary network and port interfaces 415 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 400 with another device, external component, or a network and receive stored instructions, data, tokens, etc.

Data processing system 400 also includes display controller and display device 420 and one or more input or output ("I/O") devices and interfaces 425. Display controller and display device 420 provides a visual user interface for the user. I/O devices 425 allow a user to provide input to, receive output from, and otherwise transfer data to and from the system. I/O devices 425 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 4.

Data processing system 400 is an exemplary representation of one or more of host computer(s) 105-106, switch 150, management server(s) 165, and client device(s) 185 described above. Data processing system 400 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 400 may be a network computer, server, or an embedded processing device within another device or consumer electronic product. As used herein, the terms computer, device, system, processing system, processing device, and "apparatus comprising a processing device" may be used interchangeably with data processing system 400 and include the above-listed exemplary embodiments.

It will be appreciated that additional components, not shown, may also be part of data processing system 400, and, in certain embodiments, fewer components than that shown in FIG. 4 may also be used in data processing system 400. It will be apparent from this description that aspects of the inventions may be embodied, at least in part, in software. That is, the computer-implemented method 300 may be carried out in a computer system or other data processing system 400 in response to its processor or processing system 405 executing sequences of instructions contained in a memory, such as memory 410 or other non-transitory machine-readable storage medium. The software may further be transmitted or received over a network (not shown) via network interface device 415. In various embodiments, hardwired circuitry may be used in combination with the software instructions to implement the present embodiments. Thus, the techniques are not limited to any specific combination of hardware circuitry and software, or to any particular source for the instructions executed by data processing system 400.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
   receiving a first packet addressed to a first virtual link layer address;
   determining whether the first virtual link layer address for the first packet is a private virtual link layer address for a first virtual machine of a first plurality of virtual machines on a first host computer or is shared by each of the first plurality of virtual machines on the first host computer;
   in response to determining that the first virtual link layer address is the private virtual link layer address for the first virtual machine, mapping the flow of packets to the first virtual machine using the private virtual link layer address;
   in response to determining that the first virtual link layer address is shared by the first plurality of virtual machines,
       mapping a flow of packets including the first packet to the first virtual machine within the first plurality of virtual machines, wherein the flow of packets is mapped using a load balancing algorithm, and
       forwarding the first packet to the first virtual machine; and
   receiving a second packet from the first virtual machine in response to the first packet, wherein the second packet includes the first virtual link layer address as a source address for the first virtual machine.

2. The computer-implemented method of claim 1, wherein each of the first plurality of virtual machines on the first host computer is also configured to share a virtual network layer address.

3. The computer-implemented method of claim 1, wherein each of a second plurality of virtual machines on a second host computer is also configured to share the first virtual link layer address.

4. The computer-implemented method of claim 3, wherein each of the first plurality of virtual machines on the first host computer and each of the second plurality of virtual machines on the second host computer is configured to share a second virtual network layer address and a second virtual link layer address.

5. The computer-implemented method of claim 3, wherein each of the first plurality of virtual machines on the first host computer and each of the second plurality of virtual machines on the second host computer is also configured with a private link layer address that is not shared with other virtual machines within the first and second plurality of virtual machines, and wherein mapping the flow of packets to the first virtual machine includes mapping the flow of packets to the private link layer address for the first virtual machine.

6. The computer-implemented method of claim 5, further comprising:
receiving a third packet, the third packet including the first virtual link layer address as a destination address;
determining that the third packet belongs to the flow of packets;
determining that the first virtual machine has been migrated from the first host computer to the second host computer;
updating the destination address of the third packet to replace the first virtual link layer address with the private link layer address for the first virtual machine based upon the mapping of the flow of packets; and
transmitting the updated third packet to the second host computer.

7. The computer-implemented method of claim 6, wherein the first virtual machine receives the updated third packet while running on the second host computer and transmits a fourth packet in response to the updated third packet, the fourth packet including the first virtual link layer address as the source address for the first virtual machine.

8. The computer-implemented method of claim 6, wherein one or more ports of the first host computer are configured to be included within a first virtual link aggregation group (LAG) and a second set of one or more ports of the second host computer are configured to also be included within the first LAG, wherein the first and second sets of ports are coupled to a switch, and wherein the configuration of the first LAG includes the switch performing load balancing between uplinks to ports within the first LAG for packets addressed to the first virtual network layer address or the first virtual link layer address.

9. The computer-implemented method of claim 8, wherein a first private port of the first host computer and a second private port of the second host computer is each excluded from the first LAG, and wherein the transmitting the updated third packet includes the virtualization software of the first host computer transmitting the updated third packet via the first private port and the second host computer receiving the updated third packet via the second private port.

10. A non-transitory computer-readable medium storing instructions, which when executed by a processing device, cause the processing device to perform a method comprising:
receiving a first packet addressed to a first virtual link layer address;
determining whether the first virtual link layer address for the first packet is a private virtual link layer address for a first virtual machine of a first plurality of virtual machines on a first host computer or is shared by each of the first plurality of virtual machines on the first host computer;
in response to determining that the first virtual link layer address is the private virtual link layer address for the first virtual machine, mapping the flow of packets to the first virtual machine using the private virtual link layer address;
in response to determining that the first virtual link layer address is shared by the first plurality of virtual machines,
mapping a flow of packets including the first packet to the first virtual machine within the first plurality of virtual machines, wherein the flow of packets is mapped using a load balancing algorithm, and
forwarding the first packet to the first virtual machine; and
receiving a second packet from the first virtual machine in response to the first packet, wherein the second packet includes the first virtual link layer address as a source address for the first virtual machine.

11. The non-transitory computer-readable medium of claim 10, wherein each of the first plurality of virtual machines on the first host computer is also configured to share a virtual network layer address.

12. The non-transitory computer-readable medium of claim 10, wherein each of a second plurality of virtual machines on a second host computer is also configured to share the first virtual link layer address.

13. The non-transitory computer-readable medium of claim 12, wherein each of the first plurality of virtual machines on the first host computer and each of the second plurality of virtual machines on the second host computer is configured to share a second virtual network layer address and a second virtual link layer address.

14. The non-transitory computer-readable medium of claim 12, wherein each of the first plurality of virtual machines on the first host computer and each of the second plurality of virtual machines on the second host computer is also configured with a private link layer address that is not shared with other virtual machines within the first and second plurality of virtual machines, and wherein mapping the flow of packets to the first virtual machine includes mapping the flow of packets to the private link layer address for the first virtual machine.

15. The non-transitory computer-readable medium of claim 14, the method further comprising:
receiving a third packet, the third packet including the first virtual link layer address as a destination address;
determining that the third packet belongs to the flow of packets;
determining that the first virtual machine has been migrated from the first host computer to the second host computer;
updating the destination address of the third packet to replace the first virtual link layer address with the private link layer address for the first virtual machine based upon the mapping of the flow of packets; and transmitting the updated third packet to the second host computer.

16. The non-transitory computer-readable medium of claim 15, wherein the first virtual machine receives the updated third packet while running on the second host computer and transmits a fourth packet in response to the updated third packet, the fourth packet including the first virtual link layer address as the source address for the first virtual machine.

17. The non-transitory computer-readable medium of claim 15, wherein one or more ports of the first host computer are configured to be included within a first link aggregation group (LAG) and a second set of one or more ports of the second host computer are configured to also be included within the first LAG, wherein the first and second sets of ports are coupled to a switch, and wherein the configuration of the first LAG includes the switch performing load balancing between uplinks to ports within the first LAG for packets addressed to the first virtual network layer address or the first virtual link layer address.

18. The non-transitory computer-readable medium of claim 17, wherein a first private port of the first host computer and a second private port of the second host computer is each excluded from the first LAG, and wherein the transmitting the updated third packet includes the virtualization software of the first host computer transmitting the updated third packet via the first private port and the second host computer receiving the updated third packet via the second private port.

19. A first host computer comprising:
a processing device; and
a memory coupled to the processing device, the memory storing instructions which, when executed by the processing device, cause virtualization software of the first host computer to:
receive a first packet addressed to a first virtual link layer address;
determine whether the first virtual link layer address for the first packet is a private virtual link layer address for a first virtual machine of a first plurality of virtual machines on a first host computer or is shared by each of the first plurality of virtual machines on the first host computer;
in response to determining that the first virtual link layer address is the private virtual link layer address for the first virtual machine, map the flow of packets to the first virtual machine using the private virtual link layer address;
in response to determining that the first virtual link layer address is shared by the first plurality of virtual machines,
map a flow of packets including the first packet to the first virtual machine within the first plurality of virtual machines, wherein the flow of packets is mapped using a load balancing algorithm, and
forward the first packet to the first virtual machine; and
receive a second packet from the first virtual machine in response to the first packet, wherein the second packet includes the first virtual link layer address as a source address for the first virtual machine.

20. The first host computer of claim 19, wherein each of a second plurality of virtual machines on a second host computer is also configured to share the first virtual link layer address, and each of the first plurality of virtual machines on the first host computer and each of the second plurality of virtual machines on the second host computer is also configured with a private link layer address that is not shared with other virtual machines within the first and second plurality of virtual machines, and wherein mapping the flow of packets to the first virtual machine includes mapping the flow of packets to the private link layer address for the first virtual machine, wherein execution of the instructions further cause the virtualization software of the first host computer to:
receive a third packet, the third packet including the first virtual link layer address as a destination address;
determine that the third packet belongs to the flow of packets;
determine that the first virtual machine has been migrated from the first host computer to the second host computer;
update the destination address of the third packet to replace the first virtual link layer address with the private link layer address for the first virtual machine based upon the mapping of the flow of packets; and
transmit the updated third packet to the second host computer.

* * * * *